United States Patent Office 3,469,618
Patented Sept. 30, 1969

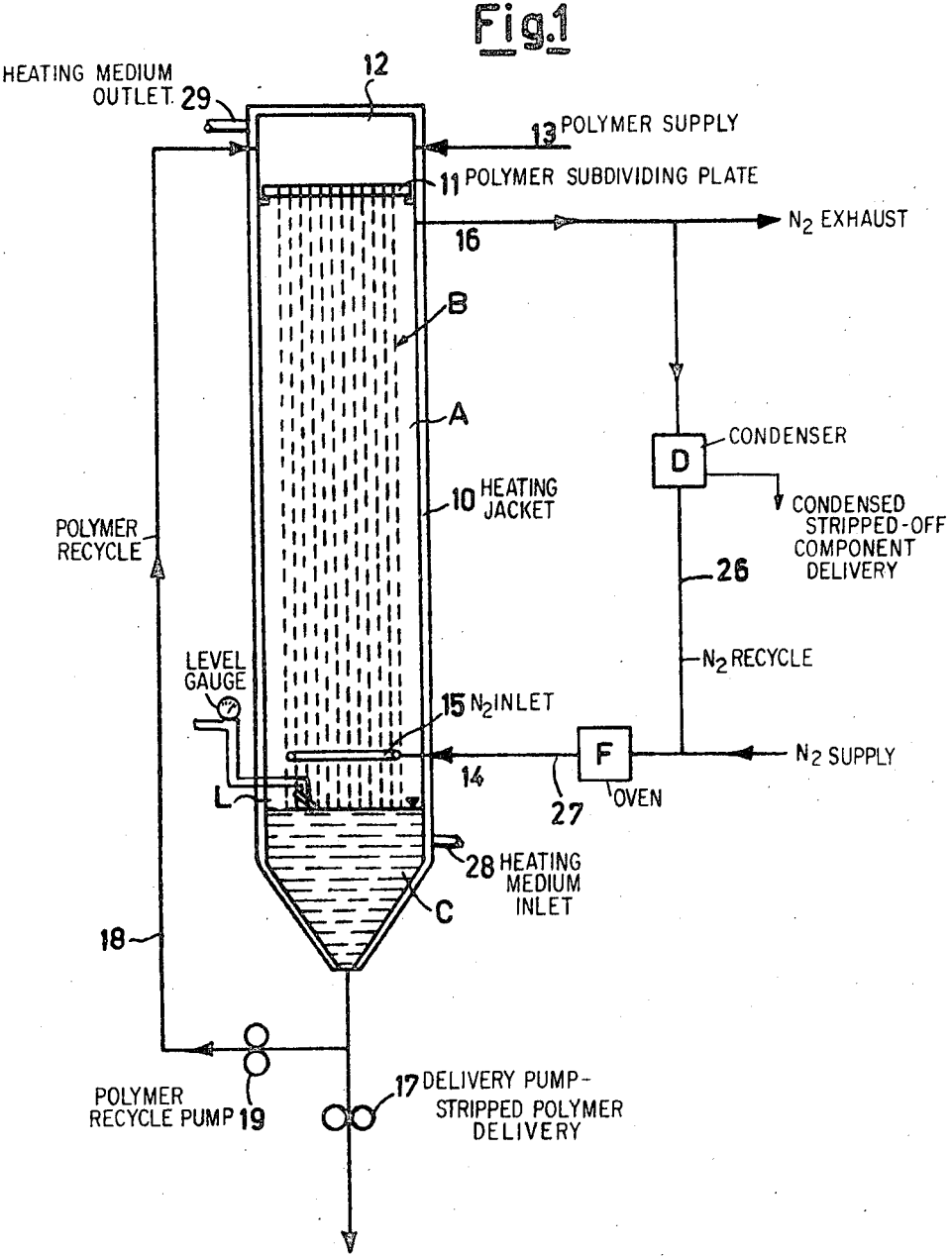

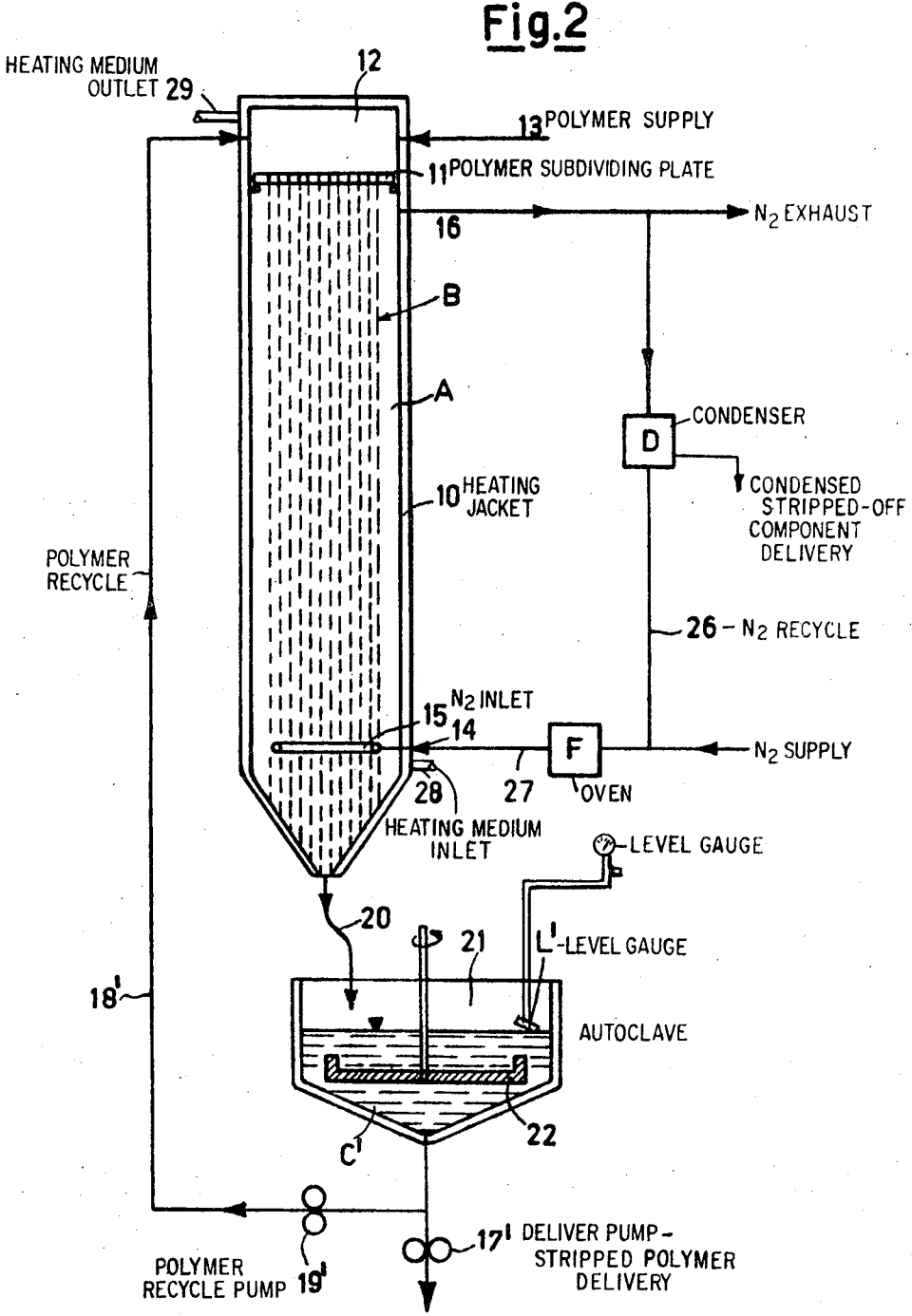

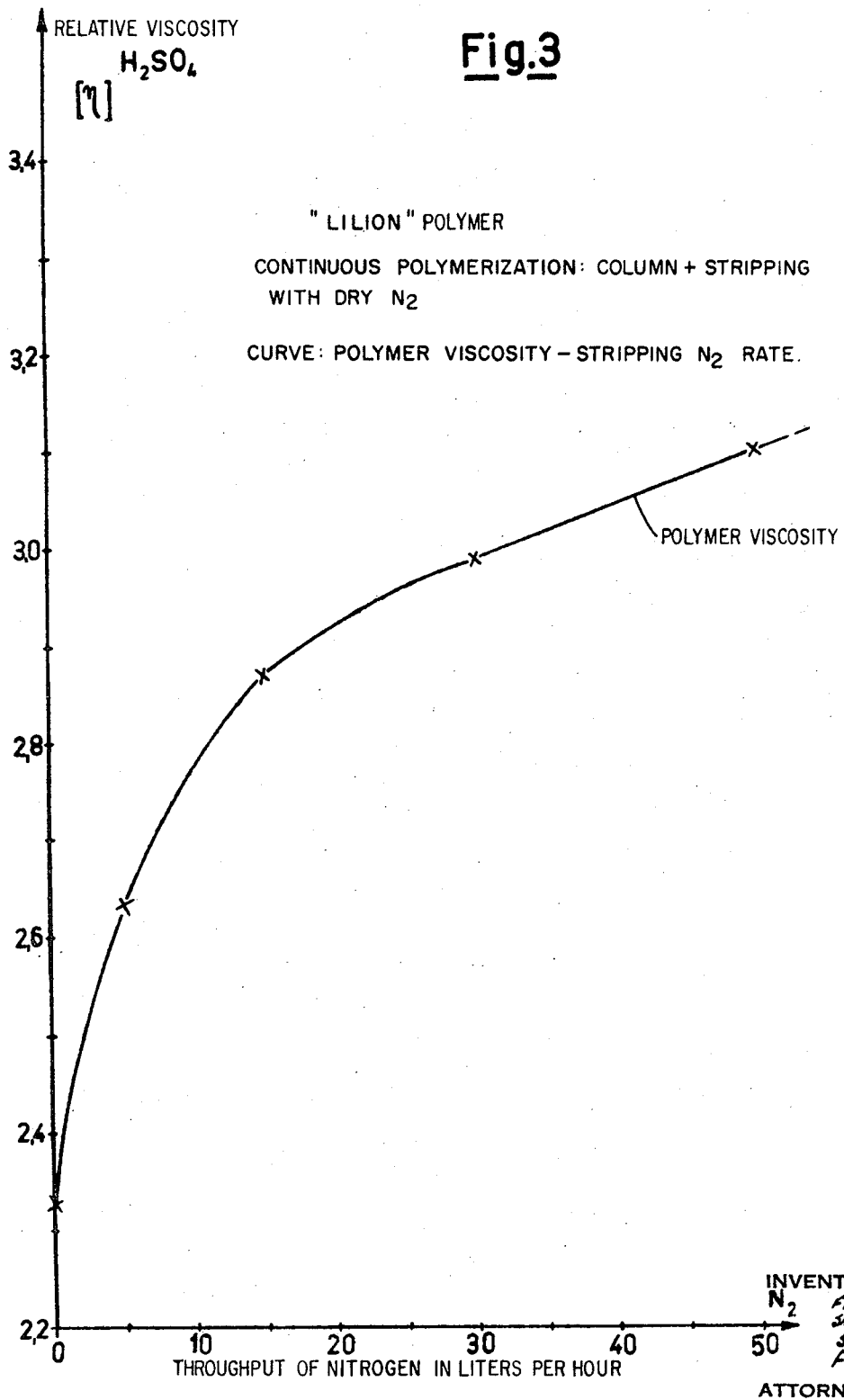

3,469,618
SOLVENT REMOVAL FROM POLYMERIC MATERIALS
Francesco Siclari, Cesano Maderno, and Sergio Fulmini, Milan, Italy, assignors to Snia Viscosa Società Nazionale Industria Applicazioni Viscosa S.p.A., Milan, Italy, a company of Italy
Filed Oct. 19, 1965, Ser. No. 497,709
Claims priority, application Italy, Oct. 30, 1964, 23,346
Int. Cl. B01d 1/16, 1/14
U.S. Cl. 159—48                                   8 Claims

ABSTRACT OF THE DISCLOSURE

A process and apparatus are disclosed for stripping volatile fractions from polyamides and polyesters to increase their viscosity. The liquid polyamide or polyester to be treated is fed into the top of a container at a temperature above the melting point of the material, and the material is passed through a foraminous plate to subdivide it into liquid threads, and then allowed to fall freely in nitrogen, which is counterflowed to the falling material. The falling material separates into droplets to provide the maximum surface exposure of the material to the counter-flowing nitrogen. At least part of the fallen material is recycled to the upper part of the container and its free fall is repeated to increase the exposure to the inert gas.

---

This invention relates to the industrial technology for the production of synthetic materials in general and, more particularly, to the performance of a process, and more particularly the final stages thereof, for removing substances and light fractions from polymers obtained by polymerization or polycondensation with an ensuing increase of the viscosity.

It is known that, during progress of said processes, it is necessary gradually to remove from the polymers being formed, the lightweight substances or fractions, more particularly the water formed throughout the polymerization stage, in order to increase the viscosity of the product. Viscosity varies as a function of the polymeric unit number in correspondence with the variation of the polymer's chain length.

While, as is known, the polymerization run goes on smoothly during the initial stages, as the polymer viscosity is increased, the removal of the lightweight fractions being left and the inherent increase of viscosity until the values required for the industrial use of the synthesized product prove to be harder and harder. Generally speaking, one resorts to the employment of processes for the removal of the lightweight fractions by in vacuo treatments of the viscous mass, preferably while stirring the latter. Said treatments are usually continued, e.g. in the case of the production of Nylon 6 or of Lilion until reaching values of viscosity relative to sulphuric acid in the order of magnitude of 2.6 to 2.7.

The conventional in vacuo procedures suffer from the drawback an oxidation of the product is likely to occur whenever the vacuum seal of the reactor is not perfect. Moreover, while the obtention of the vacuum does not exhibit serious difficulties with a batch process, the application of such technics in a continuous process would become extremely toilsome, especially as regards the introduction and removal of materials when maintaining the desired degree of vacuum within the autoclave.

It is an object of the present invention to provide a method, which is not subjected to the limitations or shortcomings of the prior art methods, for attaining the desired viscosity characteristics for the polymer by removing therefrom the lightweight substances or fractions.

In greater detail, the present invention aims to providing a method for performing the lightweight fraction removal stage from polymers under formation, said method being based on the principle of bringing about, at ambient pressure or at a pressure near the ambient pressure, a physical comminution of the low-viscosity polymer mass to be subjected to the treatment, into a plurality of individual portions having, each, a slenderest crosssectional area and placing said mass in contact with a conditioned gaseous atmosphere. By so doing, a considerable increment of the surface-to-volume ratio of the polymer is obtained in order that the removal of said lightweight fraction from said polymer may be facilitated and encouraged in a suitably conditioned atmosphere.

A complementary object of the present invention is to provide an installation, to be detailed described hereinafter, adapted to carry out the removal process according to the inventive method. Said process will be connoted hereinafter with the term "stripping" as commonly used also in allied technologies.

For the sake of simplicity, the present invention will be described in the ensuing disclosure with reference to a stripping process on caprolactam derived polymers, i.e. for the preparation of Nylon 6. Be it understood, however, that the invention is in no wise limited to said industrial application, since the modes of operation and the application of the inventive ideas to be exposed later can be advantageously resorted to in any equivalent instance such as the production of Nylon 66, polyesters, and other polycondensates in general and, at any rate, the production of other polymers which require a final stripping stage so as to remove the lightweight fractions while concurrently reaching the desired degree of viscosity and, anyhow, in the final treatment stages of any substances which demand such a stripping.

Broadly, the inventive method comprises the steps of introducing the liquid viscous material in the top portion of a closed container, placing said material in said container and causing it to fall therealong through a plurality of passageways and in generally of orifices through which said material comes out in dividend form of continuous liquid threads having a small cross-sectional area and further divided into droplets, said falling movement taking place (for a height of fall of at least 20 ins.) within a conditioned atmosphere whose composition and temperature is such as to encourage the removal of water and anyhow of the lightweight fractions from the surface of the material particles.

More particularly, said atmosphere is heated to a suitable temperature which is such, in any case, as not to alter the properties of the material undergoing treatment.

Still more particularly, said atmosphere is a gaseous inert atmosphere, for example nitrogen, carbon dioxide or also dry steam or, anyhow a gaseous atmosphere in which no oxygen is present and which is preferably heated at an appropriate temperature so as to avoid overcooling of the melted polymer.

In order that water vapor or the lightweight fractions may be removed from the polymer, said inert gas, such as nitrogen or dry steam, is brought into contact with the polymer which is falling in divided form in that atmosphere, either in downstream or counterflow relationship therewith.

It should be noted that, in order to limit the consumption of said inert gas in the apparatus, a suitable recycling thereof is performed as a rule in the stripping apparatus, care being taken, of course, suitably to separate the stripped substances from the inert gas before feeding it to the same apparatus again.

It should be also noted that the insert gas being brought into contact with the polymer, either straightway or during recycling (said separation of the stripped substances taking place during recycling), may contain controlled amounts of said substances providing, however, that said amounts do not exceed those which are in equilibrium with the polymer being processed.

The material exposed to said atmosphere, as its falling therein is completed, will be collected at the bottom of said container or also in a separate container, for example in an autoclave, in the at rest condition or with stirring in order that the process run may be completed. The polymer will be sent thereafter to the extrusion stage by means of a pump.

The stripping of water and of the lightweight fractions is warranted by a suitable length of time of exposure of the polymer to the conditioned atmosphere in the stripping container during falling of said material therealong in divided form, said length of time being determined by the height of falling and by the falling speed of the liquid threads or droplets in said atmosphere. The time of exposure can be increased for example by recycling the material in said atmosphere or by duplication of the process in two or more stripping chambers.

A particular description of embodiments of apparatus adapted to put the inventive method into practice will be given hereinafter.

Said apparatus are shown in quite diagrammatical a way, while dispensing with the merely constructional and structural details individually known to those skilled in the art, in the accompanying drawings, wherein:

FIGURE 1 shows in elevational view an example of apparatus in which the mass is collected on the bottom of the same container in which said material is caused to fall in divided form, the possible recycling of the material being also shown so as to increase the time of treatment as aforesaid.

FIGURE 2 similarly shows an alternative embodiment in which said collection stage is performed by a separate autoclave equipped with stirring means.

FIGURE 3 is a plot of the viscosity increases obtained for different supply rates, in liters per hour, of the inert gas, $N_2$.

In the embodiment shown FIG. 1, the stripping enclosure A for the stripping by dropping in divided form is formed by the inside of a container 10, e.g. cylindrical, having a vertical axis and a height which is great with respect to its diameter. By means of a foraminous transversal plate 11, a chamber 12 is formed in the top portion of said container, wherein the polymer is introduced through an input 13. Said introduction is preferably effected by a metering pump and other means adapted to send the material under treatment in the desired amounts as related to the time. The material sent to the chamber 12 can be at atmospheric pressures or also at higher pressures, consistently with that which is necessary to ensure the falling of said material through the foraminous plate 11.

Said plate is fitted with a plurality of orifices having a suitable cross-sectional area, corresponding as a rule to a diameter not exceeding 5 mms., but also orifices having also larger diameters, e.g. of 10 mms. can be considered as being adapted to the ends of the invention. Said orifices are intended to assure the division of the material in liquid threads which, as they come out of said orifices and possibly also during their gradually accelerated falling motion, can be further divided into droplets.

The material, which falls in the form of liquid threads or droplets as diagrammatically shown at B, is in an inert atmosphere formed by a gas continually supplied at 14, for example through a foraminous tubular ring 15, said gas being caused to circulate in counterflow with respect to the falling material B, said gas being removed at 16 to be sent thereafter to conventional devices (not shown) for stripping water vapor and the lightweight fractions removed from the material B, with a view of possibly recovering and recycling the gas aforesaid.

The inert gas or the vapor can be recycled through a return circuitry 26 comprising means for removing the components to be stripped, such as a condenser D and through a circuitry 27 of introduction or re-introduction of the gas or vapor, which comprises heating means, such as an oven F, for imparting to said gas or vapor the most appropriate temperature.

The material falling to the bottom of the container 10 is collected as a mass C which is maintained at the proper level by adjustable level gauges L.

The removal of said material from the stripping container can take place, for example, by means of a metering pump 17. Said mass C, in the conditioned stripping atmosphere, undergoes a completion of the process.

In order that the exposure of said material in divided form B to said atmosphere may be increased, the implementation may be completed by a circuitry 18, equipped with a metering pump 19, for recycling and returning said material to the feeding chamber 12.

In the alternative embodiment shown FIG. 2, wherein parts equivalent to those described above are connoted by equal reference symbols or numericals, the bottom end of the container 10 is put in communication, via a duct 20, with an autoclave 21 fitted with stirring means 22 and in which the mass C' of the material having traveled through the stripping atmosphere A, is collected to undergo the process completion stage.

The level of the material in said autoclave 21 is volumetrically metered by proportioning the discharge, e.g. by a pump 17' controlled by the level gauges L'. In a similar way one can provide a circuitry 18' and a pump 19' for recycling the material from a point downstream of the autoclave 21 to the entrance chamber 12' of the stripping enclosure A'.

A few examples will now follow of practical application of the inventive method, as resulted from experiments performed in an apparatus constructed essentially according to the embodiment of FIG. 2 and having the following constructional and dimensional specifications:

The stripping enclosure A has been built so as to have a height of fall of 40 ins. for the material in its divided form B.

The partition plate 11 has 120 orifices having each a diameter of 2 mms., spaced each other by 3 mms., so as to avoid that the falling liquid threads or droplets may come into possible mutual contact, thus assuring a free fall and the certainty of dispersion throughout the gaseous atmosphere.

An autoclave 21 has been used, having a capacity of 13 lbs. of material and fitted with a two-pronged stirrer 22 rotated at a speed of 10 r.p.m.

The jacketed container 10 is heated by circulating diphenyl in its jacket. The heating medium enters the jacket through a duct 28 near the bottom of the container, and flows out through a duct 29 near the top of the container.

The tests have been performed by carrying out a stripping procedure on Nylon 6 of the kind known in the market as "Lilion" by heating the atmosphere with circulation of diphenyl at 260° C. Obviously the temperature of the atmosphere is chosen consistently with the nature of the polymer to be treated. No recycling of the material in the line 18' has been performed.

The apparatus is fed with polymer at a constant rate of flow of about 2.2 lbs. per hour. The several viscosity-increase tests are carried out by introducing in the atmosphere said polymer having a viscosity "eta" (the Greek letter commonly used to designate relative viscosity) relative to sulphuric acid of 2.25 to 2.30 and a monomer content ranging from 8.5 to 9.5% and a number of amino end groups $—NH_2=$ to 50–55 amino groups $NH_2$ per 1,000 kgs. of polymer.

The results of the inventive method have been identified and checked by acting upon the rate of flow of nitrogen circulated in the stripping chamber. Said results, for the different rates of flow of dry nitrogen are plotted in the graph of FIG. 3, the curve shown therein being an interpolation of the data readings as tabulated in the following table:

| Rate of flow of nitrogen, liters/hour | Viscosity relative to sulph. acid "eta" | Monomer, percent | $-NH_2$ groups per 1,000 kgs. polymer |
|---|---|---|---|
| 0 | 2.30-2.35 | 8.5-9.5 | 53-55 |
| 5 | 2.60-2.66 | 8.5-9.5 | 40-43 |
| 15 | 2.82-2.92 | 8.5-9.5 | 36-37 |
| 30 | 2.94-3.04 | 8.5-9.5 | 32-34 |
| 50 | 3.2 (3.1-3.5) | 8.5-9.5 | 25-29 |

Tests have not been continued for rates of flow over 50 liters an hour of nitrogen since the values of the viscosity, as reached, are, as the table shows, much higher than those currently required.

The tests as reported above then clearly show the high efficiency which can be obtained by adopting the inventive method and apparatus.

It is thus clearly apparent that said method and said apparatus permit to assure a perfectly controllable production, in that the desired degree of viscosity is definitely a function of the rate of flow of the nitrogen being circulated and can thus be determined beforehand by merely adjusting the feeding means for the inert gas to be circulated.

We claim:

1. A method for stripping off volatile fractions from polyamides and polyesters and simultaneously increasing the viscosity of the polyamides or polyesters, which comprises
   feeding the material to be treated into the upper end of an enclosure at a temperature above the melting point of the material,
   dividing said feed material into droplets and/or liquid threads in the upper part of said enclosure to increase the exposure surface of said material,
   causing the thus divided material to come into contact with an inert gaseous atmosphere by causing said material to fall freely within an inert gaseous atmosphere in said enclosure, while recirculating said inert atmosphere in said enclosure in counterflow to the falling material,
   collecting the fallen material in the lower part of said enclosure, and
   continuously passing all of the collected material into a separate zone,
   agitating the material in said zone,
   volumetrically metering for removal a predetermined part of the material from said zone, based upon the level of the material in said zone,
   and removing another metered, predetermined proportion of the material from said zone and recycling the latter portion of the material to the upper part of said enclosure, and
   causing said recycled material to repeat its free fall within said inert atmosphere, thereby multiplying the time of exposure of said recycled portion of the material to said inert atmosphere, while feeding continuously additional material into the enclosure, at a tempertaure above its melting point, for treatment.

2. A method as defined in claim 1, wherein said gaseous atmosphere is formed by superheated steam.

3. A method as defined in claim 1 wherein the gaseous inert atmosphere is recirculated in said enclosure after removal therefrom of at least part of the volatile fractions stripped off by said atmosphere from said material.

4. A method as defined in claim 1 wherein said material is passed into said enclosure through orifices having a diameter no greater than ten millimeters.

5. A method as defined in claim 4, wherein the diameter of said orifices is no greater than five millimeters.

6. A method as defined in claim 4, wherein the height of fall of said material within said inert atmosphere is at least twenty inches.

7. A method as defined in claim 1, wherein said gaseous atmosphere is a heated gas.

8. A method as defined in claim 7, wherein said gaseous inert atmosphere consists of heated dry nitrogen.

References Cited

UNITED STATES PATENTS

| | | | |
|---|---|---|---|
| 2,187,877 | 1/1940 | Ferris et al. | 260—85 |
| 2,719,776 | 10/1955 | Kummel | 18—54 |
| 2,849,430 | 8/1958 | Amos et al. | |
| 3,231,413 | 1/1966 | Berquin | 159—48 X |
| 3,296,240 | 1/1967 | MacDonald et al. | 260—93.7 |
| 3,368,874 | 2/1968 | Ludewig | 23—283 |
| 2,933,527 | 4/1960 | Guyer et al. | 260—555 |

FOREIGN PATENTS 1,027,314   5/1953   France.

NORMAN YUDKOFF, Primary Examiner

J. SOFER, Assistant Examiner

U.S. Cl. X.R.

260—96